United States Patent [19]
Christie

[11] Patent Number: 5,599,097
[45] Date of Patent: Feb. 4, 1997

[54] EXTRUDER SCREW FOR PLASTIC EXTRUDERS

[75] Inventor: Andrew W. Christie, Fulton, N.Y.

[73] Assignee: The Black Clawson Company, Middletown, Ohio

[21] Appl. No.: 572,679

[22] Filed: Dec. 14, 1995

[51] Int. Cl.⁶ ...................................................... B29B 7/42
[52] U.S. Cl. ............................................... 366/88; 366/89
[58] Field of Search ........................... 366/79–85, 88–90, 366/318, 319, 322–324; 425/204, 208, 209

[56] References Cited

U.S. PATENT DOCUMENTS

| | | | |
|---|---|---|---|
| 3,698,541 | 10/1972 | Barr | 425/208 X |
| 3,858,856 | 1/1975 | Hsu | 366/88 |
| 4,000,884 | 1/1977 | Chung | 366/88 |
| 4,128,341 | 12/1978 | Hsu | 366/323 X |
| 4,227,870 | 10/1980 | Kim | 366/79 X |
| 4,341,474 | 7/1982 | Wheeler, Jr. et al. | 366/323 X |
| 4,405,239 | 9/1983 | Chung et al. | 425/208 X |
| 4,729,662 | 3/1988 | O'Brien | 366/89 |
| 4,733,970 | 3/1988 | Yokana | 425/208 X |
| 4,770,539 | 9/1988 | Heathe | 366/88 |
| 4,786,181 | 11/1988 | O'Brien | 366/89 |
| 4,896,969 | 1/1990 | Dray | 366/88 |
| 4,944,906 | 7/1990 | Colby et al. | 366/89 X |
| 5,141,326 | 8/1992 | Eshima | 366/89 X |

FOREIGN PATENT DOCUMENTS

| | | | |
|---|---|---|---|
| 59-19133 | 1/1984 | Japan | 366/79 |
| 59-188418 | 10/1984 | Japan | 366/79 |
| 59-202835 | 11/1984 | Japan | 366/79 |

*Primary Examiner*—Charles E. Cooley
*Attorney, Agent, or Firm*—Biebel & French

[57] ABSTRACT

An extruder screw for use in the barrel of a plastic materials extruder is formed with a melt section which includes a melt flighting and a compaction channel and which also includes a barrier flight in which only smooth transitions are formed to prevent pressure surges or disruptions. The barrier flight rises radially outwardly of a forward wall of the melt channel, and defines a clearance space with the adjacent wall of the barrel which varies from a maximum at the beginning of the barrier flight to a minimum at the end of the barrier flight. The varying clearance between the barrier flight and the barrel wall approximates the change in viscosity of molten plastic material flowing over the barrier flight from the solids channel into the melt channel, so that a relatively constant shear energy input is applied to the molten plastic material flowing over the barrier flight.

3 Claims, 4 Drawing Sheets

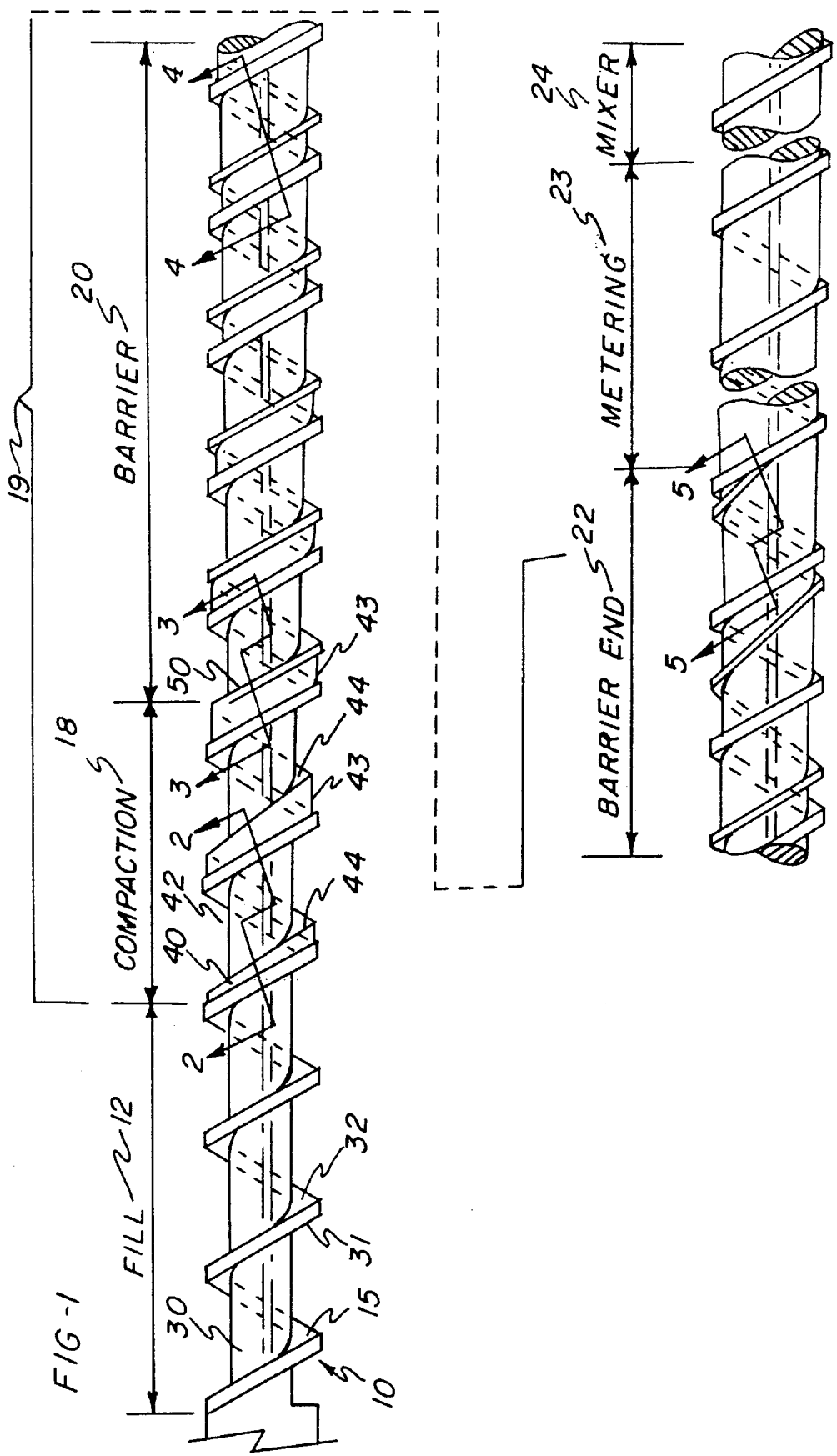

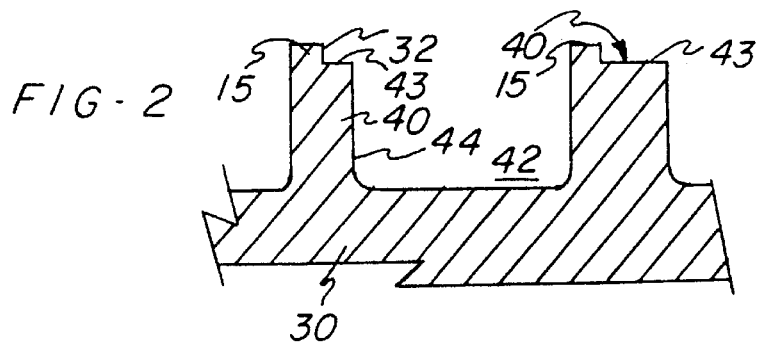
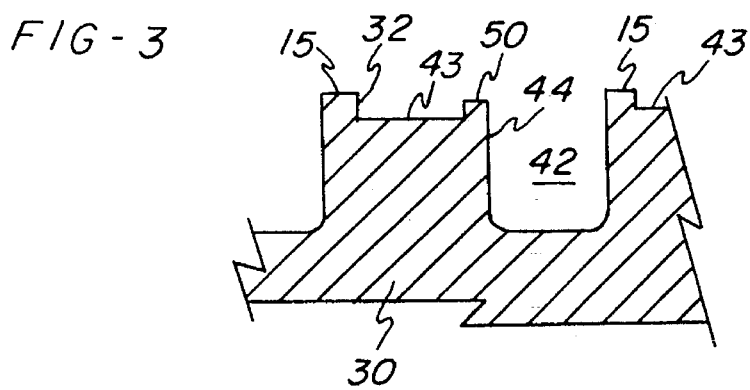
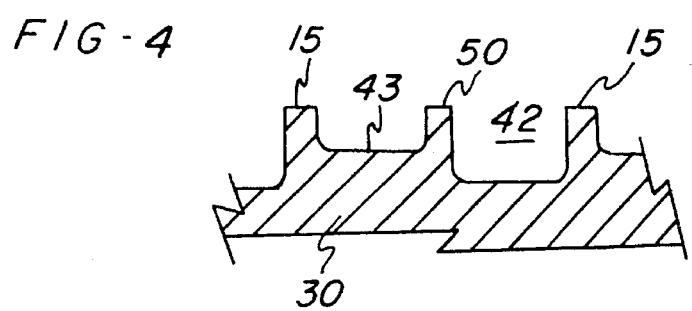
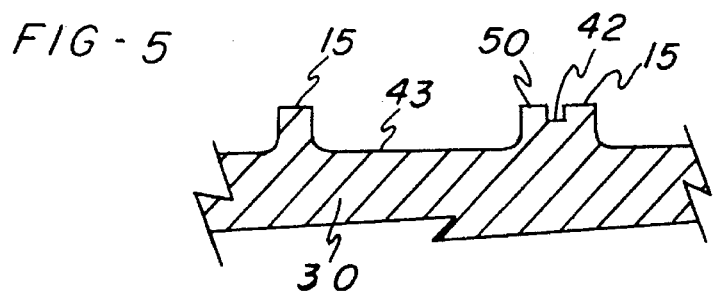

EXTRUDER SCREW FOR PLASTIC EXTRUDERS

BACKGROUND OF THE INVENTION

This invention relates to an extruder screw for use in the barrel of a plastics material extruder and is more particularly directed to the construction and design of the portion of the screw beginning with the initial fill with unmelted plastic material, through the initial melting and plastic material compacting stage and through and including the first dispersive mixing stage in which the molten plastic material traverses a melt barrier flight and runs into and along a channel separate from the channel for compacted unmelted plastic material.

The concept of providing separate flighting and resulting separate channels for melted and unmelted plastic material, in the initial stages of an extruder screw is shown a number of prior patents, including Chung et al, U.S. Pat. No. 4,405,239, issued Sep. 20, 1983; Hsu, U.S. Pat. No. 3,858,856, issued Jan. 7, 1975; Chung, U.S. Pat. No. 4,000,884, issued Jan. 4, 1977; and Barr, U.S. Pat. No. 3,698,541, issued Oct. 17, 1972.

A particular difficulty of many prior designs is the fact that in the development of the flighting to create the solids compaction channel separate from the melt channel causes a sudden change in the pitch or the depth of a developing channel and results in a flow disruption, a discontinuity, and often the packing of the melt channel with solids. These disruptions can cause a variation in pressure, consistency and also, rate of output of the screw.

While prior designs have used a barrier flight to separate a melt channel from a solids compaction channel, the barrier flight has commonly had a constant clearance with the barrel, with the result that a much higher specific energy input is applied at the beginning of the barrier section when the melt viscosity is high than at the end of the melt channel when the viscosity of the melted phase is much lower. Such an arrangement inherently causes a non-uniform shear energy input to the melt over the length of the barrier flight. As a result, that polymer initially traversing the melt barrier experiences a high shear energy input and a long residence time at the elevated melt temperature while that polymer passing over the melt barrier at the end of the solids channel experiences a lower shear energy input, and a reduced barrier at the end of the solids channel experiences a lower shear energy input and a reduced residence time at elevated melt temperatures creating an inconsistent melt quality. The present invention eliminates this inconsistency.

Further, in the transition between a barrier section and a conventional metering section, designs have been proposed in which there has been no thought of maintaining a balance of pressures between the compaction channel carrying the solids and the adjacent melt channel, nor has provision been made to accommodate polymers of varying melt rates. An abrupt transition at the end of the solids channel can cause a pressure fluctuation, adversely affecting the performance of the screw.

SUMMARY OF THE INVENTION

This invention is directed to a extruder screw in which a melt flighting develops out of one of the flank of the flights of the primary flight, and does so gradually define a melt channel which maintains a volume, as it develops, which corresponds to the developing melting volume from the remaining unmelted plastic material. This channel is designed as to cause a minimum of disruption by eliminating abrupt changes in pitch or depth of the developing melt channel and is done in such a way as to enhance the compaction of the pellets into the solids channel with minimum disruptions.

Following the initial development of the melt channel, a barrier wall is provided which rises out of a base surface of the melt channel, and is formed with a clearance with the barrel which begins at a maximum and, at the conclusion of the barrier section, reduces to a minimum. The rate at which the clearance changes from maximum to minimum is such as to provide a substantially uniform energy input into the melt as the melt moves from the packing or solids channel across the melt barrier flight, between this flight and barrel wall, and into the melt conveying channel. In other words, the clearance between the barrier flight face and the barrel wall decreases as the melt temperature increases and melt viscosity decreases. As a result, the energy input to the melt is more uniform throughout the axial length of the barrel, creating a melt of improved consistency.

A further feature of the invention is that the melt barrier flight continues through the barrier section of the screw, forming part of the screw's melt section and closes gradually with the primary flighting while maintaining the depth of the solids channel substantially constant during the termination portion. In this manner, a balance of pressures between the solids and melt channels is maintained while the solids channel is closed off against the primary flighting leaving only the melt channel at the beginning of the metering section. This gradual balancing and closure of the barrier section maintains pressure stability and avoids a solid bed breakup due to instabilities of pressures which could otherwise occur.

It is accordingly an important object of this invention to provide an extruder screw in which a melt section has a melt channel formed at an adjacent flank of the primary flighting and tapering an axial width from a minimum at the beginning of a compaction portion to a maximum where a barrier flight begins, while maintaining a compaction channel of substantially constant depth.

It is a further object of the invention, as outlined above, to provide a barrier flight throughout a major portion of the melt section, which barrier flight has a varying clearance with the barrel wall beginning at a maximum and narrowing to a minimum as the temperature increases and viscosity decreases of the melted plastic material.

A still further object of the invention is the provision of a compaction and melt section in an extruder screw for plastics materials in which the respective channels for compaction of unmelted plastic material and for receiving melted plastic material are free of discontinuities or interruptions which can cause surges or pressure instabilities at axial portions of the screw.

These and other objects and advantages of the invention will be apparent from the following description, the accompanying drawings and the appended claims.

BRIEF DESCRIPTION OF THE DRAWINGS

FIG. 1 is a broken longitudinal view of a screw according to this invention and identifying the screw sections;

FIG. 2 is an enlarged fragmentary sectional view of the screw looking generally along the line 2—2 of FIG. 1;

FIG. 3 is another fragmentary sectional view on the same scale as FIG. 2 looking generally along the line 3—3 of FIG. 1;

FIG. 4 is a further fragmentary sectional view looking generally along the line 4—4 of FIG. 1;

FIG. 5 is another fragmentary sectional view looking generally along the line 5—5 of FIG. 1;

DESCRIPTION OF PREFERRED EMBODIMENT

Figure 6:
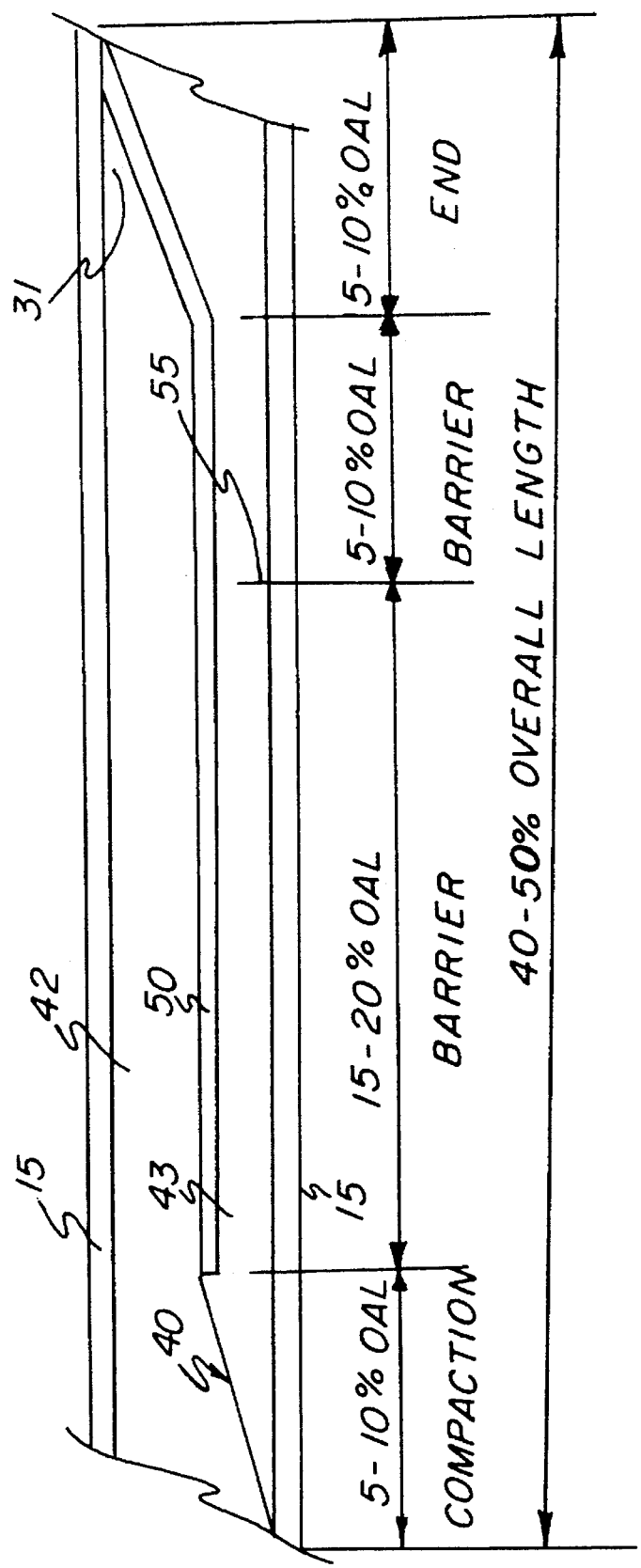
FIG. 6 is a developed or "unwrapped" view of the screw melt section flighting from the beginning of the compaction portion through the end of the barrier section.

Referring to the figures of the drawing which represent a preferred embodiment of the invention, an extruder screw made according to this invention is illustrated generally at 10 in FIG. 1. The portion of the screw which is illustrated in FIG. 1 comprising approximately 50% (from the start of the compaction portion to the end of the barrier portion) of the total length of the screw, beginning with the fill section 12 which would be position to receive unmolten or hard plastic granular or pelletized material from the hopper feed on an extruder barrel, not shown.

The fill section 12 terminates at the beginning of a compaction portion 18. The compaction portion is part of the screw melt section 19 in which the solid plastic material is progressively melted and the melt stream is separated from the solids channel.

For the purpose of this description, the remainder of the melt section 19 is described as a barrier portion 20, which leads into a barrier ending portion 22. At this point it may be assumed that all of the plastic material has been melted and delivered by the primary flighting 15 to a metering section 23 and then a mixer section 24, as conventional. The portion of the invention leading to the metering section 23 typically comprises approximately 40% to 50% of the overall length of the screw, as represented in FIG. 6.

The primary flighting 15 extends along the screw core 30 and is formed, conventionally, with a rearwardly facing generally radially extending flank 31 and a forwardly facing generally radially extending flank 32. The pitch of the primary flighting 15 is intended to be substantially uniform throughout a substantial portion of the length of the screw, at least including the length of the screw through the barrier end portion 22 and up to the metering section 23.

The compaction portion 18 of the melt section 19 begins with a melt flighting 40 which is positioned in direct abutment with the forwardly facing flank 32 of the primary flighting 15. The melt flighting in effect grows out of the forward flank and increases in axial width at a generally uniform rate throughout the turns of the compaction section 18. The melt channel defined by the surface 43 accordingly tapers in axial width from a minimum at the beginning of the compaction portion 18 to a maximum at the junction of the compaction portion 18 with the barrier portion 20. The melt flighting 40 has a forwardly facing generally radially wall 44 which defines with the adjacent rearwardly facing flank of the primary flighting 15, a decreasingly narrower compaction channel 42 for unmelted plastic material throughout the compaction portion 18. This growth in axial width is substantially a straight line function as best seen in the developed view of FIG. 6.

Figure 7:
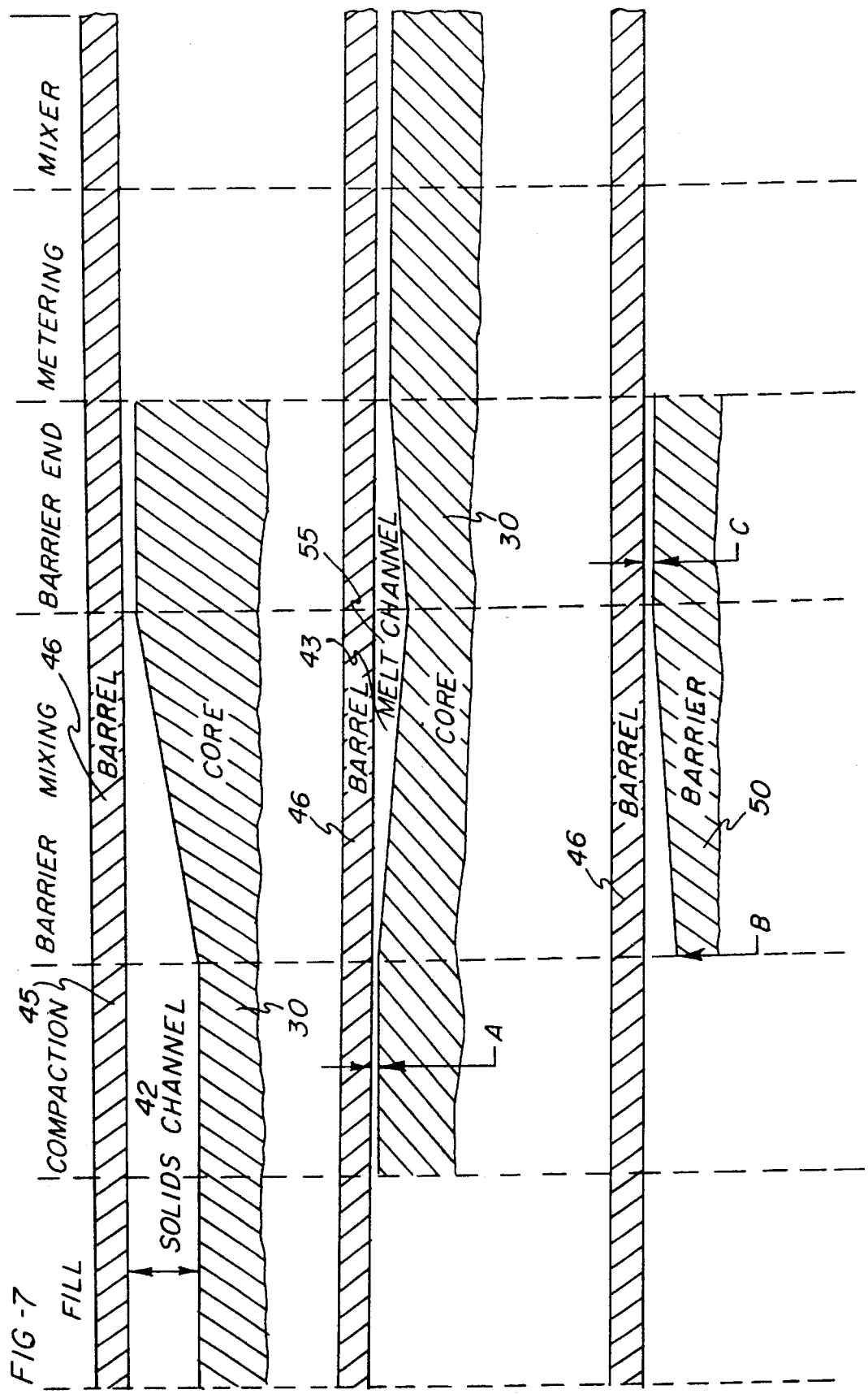
FIG. 7 is a diagram of screw root and barrier wall profiles throughout the sections thereof.

By reference to FIGS. 2 and 3, it can be seen that the melt flighting 40 is formed with a radial outer axially extending surface 43 which is generally axially flat. The melt flighting 40 is shown as being formed as an integral part of the primary screw flighting 15, as an axial outgrowth of the forward facing flank surface 32. The flighting 40, at the surface 43, provides with the adjacent flighting 15 an increasing volume which approximates the rate of melting of the plastic material in the solids channel 42. As the melt flighting 40 grows wider, the solids channel 42 grows progressively narrower throughout the compaction portion, as illustrated by the slope of the melt flighting 40, FIG. 7. Also, throughout the compaction portion, the root diameter of the core 30 remains constant, and therefore the solids channel remains uninterrupted and of constant depth, as best illustrated in FIG. 7, in which the depth of the solids channel 42, with respect to the core 30, is illustrated by reference to the wall 45 of the barrel 46.

The barrier portion 20 is defined by a barrier flight 50. The flight 50 first seen in the sectional view of FIG. 3, rises radially outwardly of the surface 43 at the forward wall 44. The elevation of the wall 50 is tapered in that it is at a minimum height at the beginning of the barrier portion 20 and increases in height smoothly to a maximum at the end of the barrier portion 20. The spacing from the barrel wall 45 is represented, in FIG. 7, at the beginning of the barrier section by the space identified by the letter "B" and the minimum space at the end of the barrier section is represented by the letter "C."

Thus, within the barrier portion, the barrier flight is an integral part of the melt flight, rises from the forward wall of the melt flight, and therefore, does not present to the compaction channel any sudden interruption. Further, the clearance represented by the profile shown in FIG. 7 provides a space for the flow of melted plastic material which decreases with the change in viscosity of the molten plastic material flowing over the top of the barrier flight 50, and is inversely proportional approximately to the change or increase in temperature. This slope of the barrier flight 50 from maximum spacing at "B" in FIG. 7 to minimum spacing at "C" in FIG. 7 is intended to provide a relatively constant shear energy input to the molten plastic as it flows from the narrowing compaction channel 42 to the channel defined by the melt flight 43.

The melt flight 40 and the delayed interposition of the barrier flight or wall 50 provides a minimum of interruption to the flow of the polymer and eliminates common causes of pressure instabilities within the screw. The melt flight 40 is introduced gradually over approximately two turns of the screw and maintains a volume in the developing melt channel which corresponds to rate of developing melt volume. There are no sudden changes either in the pitch or the depth of the channel defined by the barrier flight and primary flighting which can cause a disruption or packing of the melt channel with solids.

Within the barrier section, the root of the core 30, forming the bottom wall of the melt channel 42, increases at a rate to a accommodate the displacement of the solid material due to melting, and begins at a maximum and tapers, preferably uniformly, to a minimum as illustrated by the progressive sectional views of FIGS. 4 and 5.

The melt channel, as defined by the melt flighting 40, and the surface 43, as shown in FIG. 7, remains at a constant depth, but at a varying width throughout the compaction portion 18. A minimum spacing designated at the letter "A" (FIG. 7) is maintained throughout this section, with the increase in width accommodating the growth of the melted plastic material from the solids channel 42. Concurrently with the beginning of the barrier flight 50, the melt channel is deepened but remains at constant width until it reaches the approximate position of the barrier end portion 22 where it is at its maximum depth. This region of maximum depth may coincide with the beginning of the barrier end portion as designated by the reference numeral 55 in FIG. 6 and 7. This region of maximum depth coincides substantially with the minimum barrier flight clearance at point "C" on FIG. 7 and also coincides with the minimum depth of the solids channel 42.

The barrier flight 50 is ended gradually through the barrier end portion 22 by a progressive widening of the melt channel 43 and an inclination of the barrier flight 50 into the rearward flank surface 31 of the immediate forward flight 15, as shown in FIG. 7. While this exact position and the rate of taper may be varied, in accordance with the characteristics of the plastic material, it will be noted that this is a gradual, not a sudden change, since the closing off of the barrier flight 50 against and with the primary flighting 15 is accomplished gradually over approximately 1½ to 2 turns of flighting and while maintaining the solids channel 42 at a substantially constant depth. In this manner, any remaining solids are not suddenly disturbed or broken. By the point of closure at the forward end of section 22, there should be no unmolten solid material.

Since the melt flighting 40 is widening to occupy the entire space between the turns of the primary flighting, and since the solids channel is, at the same time, terminated, the melt channel will, through the barrier end section, grow more shallow since the total volume of melted plastic material changes very little throughout the remainder of the length of the screw. The melt channel in this zone begins its transition to the final meter depth, creating a balance of pressures between the solids and melt channels which can accommodate polymers of varying melt rates. The gradual and balanced close to the barrier section maintains pressure stability while avoiding a break up of solids in the channel 42.

A particularly important feature of the invention resides in the fact that the barrier flight provides a clearance of variable height with the barrel and is greatest at point "B" where temperatures are relatively low and viscosities are high. Following axially forward along the length of the screw, this clearance is tightened and the temperature increases and the viscosities decrease, and this variable barrier wall clearance provides for a uniform shear energy input into the melt over the length of the barrier wall. As a result, the shear history for the melt becomes more uniform.

While the form of apparatus herein described constitutes a preferred embodiment of this invention, it is to be understood that the invention is not limited to this precise form of apparatus, and that changes may be made therein such as to accommodate specific polymer properties without departing from the scope of the invention which is defined in the appended claims.

What is claimed is:

1. An extruder screw for use in the barrel of a plastic materials extruder, said screw having a drive end and having a forward end extended into said barrel, said screw comprising a core, a primary flighting extending along said core and having a generally radially extending rearwardly facing flank which conforms to a substantially uniform pitch throughout a substantial portion of the length of the screw, said screw having a fill section for receiving unmelted plastic material, a melt section adjoining said fill section, and a metering section adjoining said melt section, said melt section being defined by an unmelted plastic material compaction portion adjacent said fill section and by a barrier portion extending from said melt section to said metering section, said compaction portion being further defined by a melt flighting formed in adjacent relation to a forwardly facing flank of said primary flighting and having a radially outer surface forming a melt channel with said primary flighting, said melt flighting having a forwardly facing wall which defines with the adjacent rearward facing flank of said primary flighting a channel for unmelted plastic material, a barrier flight rising radially outwardly from said melt channel forwardly facing wall, and defining a clearance space with the adjacent wall of said barrel, said clearance space varying from a maximum at the junction of said compaction portion with said barrier portion and tapering toward said barrel wall to a minimum clearance at the junction of said barrier portion and said metering section, whereby the clearance between said barrier flight and said barrel wall approximates the change in viscosity of molten plastic material flowing over said barrier flight into said melt channel so that a relative constant shear energy input is applied to molten plastic material.

2. An extruder screw for use in the barrel of a plastic materials extruder, said screw having a drive end and having a forward end extended into said barrel, said screw comprising a core, a primary flighting extending along said core and having a generally radially extending rearwardly facing flank which conforms to a substantially uniform pitch throughout a substantial portion of the length of the screw, said screw having a fill section for receiving unmelted plastic material, a melt section adjoining said fill section, and a metering section adjoining said melt section, said melt section being defined by an unmelted plastic material compaction portion adjacent said fill section and by a barrier portion extending from said melt section to said metering section, said compaction portion being further defined by a melt flighting formed integrally with a forwardly facing flank of said primary flighting and having a radially outer surface forming a melt channel with the adjacent flank of said primary flighting, said melt channel tapering in axial width from a minimum at the beginning of said compaction portion to a maximum at the junction of said compaction portion and said barrier portion, said melt flighting having forward-facing wall which defines with the adjacent rearward facing flank of said primary flighting a channel for unmelted plastic material, a barrier flight rising radially outwardly from said melt channel forward facing wall, and defining a clearance space with the adjacent wall of said barrel, said clearance space varying from a maximum at the junction of said compaction portion with said barrier portion and tapering forward said barrel wall to a minimum clearance at the junction of said barrier portion and said metering section, whereby the clearance between said barrier flight and said barrel wall approximates the change in viscosity of molten plastic material flowing over said barrier flight into said melt channel so that a relative constant shear energy input is applied to molten plastic material.

3. An extruder screw for use in the barrel of a plastic materials extruder, said screw having a drive end and having a forward end extended into said barrel, said screw comprising a core, a primary flighting extending along said core and having a generally radially extending rearwardly facing flank which conforms to a substantially uniform pitch throughout a substantial portion of the length of the screw, said primary flighting and said core defining a fill section for receiving unmelted plastic material therein, a melt section adjoining said fill section, and a metering section adjoining said melt section, said melt section being further defined by an unmelted plastic material compaction portion positioned adjacent said fill section and by a barrier portion extending from said compaction portion to said metering section, said compaction portion being further defined by a melt flighting in abutment with a forwardly facing flank of said primary flighting and having a radially outer axially extending surface forming a melt channel with the adjacent flank of said primary flighting, said melt channel tapering in axial width from a minimum at the beginning of said compaction portion to a maximum at the junction of said compaction portion and said barrier portion, said melt flighting having a forwardly facing generally radial wall which defines with the adjacent rearward facing flank of said primary flighting a decreasingly narrower solids channel for unmelted plastic material throughout said compaction portion, said solids channel having a constant depth throughout said fill section and said compaction portion, the beginning of said barrier portion being defined by a barrier flight rising radially outwardly of said melt channel forward wall, and defining a clearance space with the adjacent wall of said barrel, said clearance space varying from a maximum at the junction of said compaction portion with said barrier portion and tapering toward said barrel to a minimum clearance at the junction of said barrier portion and said metering section, said core increasing in diameter in said solids channel from a minimum at the junction of said compaction portion with said barrier portion to a maximum at the junction of said barrier portion with said metering section, whereby the clearance between said barrier flight and said barrel wall approximates the change in viscosity of molten plastic material flowing over said barrier flight from said solids channel into said melt channel so that a relative constant shear energy input is applied to molten plastic material flowing over said barrier flight.

* * * * *